Patented Oct. 2, 1928.

1,686,281

UNITED STATES PATENT OFFICE.

KARL KÜTTEL, OF VIENNA, AUSTRIA, ASSIGNOR, BY DIRECT AND MESNE ASSIGNMENTS, OF ONE-FOURTH TO ERNST J. WATZL, OF CLEVELAND, OHIO, AND ONE-FOURTH TO HERMAN J. TRENKAMP, OF CLEVELAND HEIGHTS, OHIO.

PROCESS OF PRODUCING METAL GLUTINS AND PRODUCT THEREOF.

No Drawing. Application filed August 7, 1925. Serial No. 48,915.

This invention relates to an improved process of producing metal glutins and product thereof.

It has been known that the mechanical properties of glutin may be improved by adding salts and hydroxids of bivalent or trivalent metals.

The metal-hydroxids, in a pulverized condition, are mixed with the glutin or glutinous material and subsequently are compressed under the application of heat; or the metal-hydroxids are mixed with an aqueous glutin-solution; or the metal-hydroxids are formed in the aqueous glutin-solution by a double conversion of a metal-salt and an alkali- or alkali-carbonate solution.

However all these masses are only various mixtures of metal-glutin and free metal-hydroxid.

I have discovered that under certain conditions all the glutin can be separated as pure metal glutin, and only this material possesses the mechanical properties required of a material to be employed for manufacturing purposes. A pure metal glutin will advantageously serve as a casein substitute and is also adapted for the manufacture of many of the marketed articles now composed of bakelite. The particular merit of pure metal glutin is that it can be more quickly and more economically produced and fabricated.

In order to separate all the glutin to obtain a pure metal-glutin it is necessary:—

1. To alkalize at first the glutin-solution and thereafter separate by the aid of metal-salt.

2. To add to the glutin only such a quantity of alkali, that the entire glutin is transformed into saturated alkali-metal-glutin. This alkalinity is positively determined by the chemical character of the glutin and can be determined in various ways, such as potentiometrically or viscosimetrically.

3. To obtain the best alkalinity which is only to be realized if one observes and retains its exact proportion whereby the total glutin is precipitated, without any remaining in the solution.

4. To add an excess of the separating metallic salt solution and not a stoichiometrical proportion of the same, thus differing from the neutral reaction as is the case during the formation of metal-hydroxids.

The separated metal glutin is freed from the salts in excess by washing the same in water. For instance, in case $Al_2(SO_4)_3$ is employed for forming aluminium glutin, the aluminium or the salt solution of that metal contained in the resulting glutin metal combination will amount to 5.9%, while the sulphate embodied in the same amount to 10.25%.

From the above it is seen, that the metal-glutin also contains the anion of the separating salt. Therefore such metal-glutins can also be produced, wherein the glutin embodies inorganic or organic anions, which otherwise form with the metal-ions water-insoluble or difficultly soluble salts (for instance phosphates, silicates or various organic acid salts.)

These combinations can be produced in the following manner:—

1. The metal-glutin obtained and washed out in the described manner is treated with the aqueous solution of the alkali-metal-salts of the corresponding anions, whereby the anions are exchanged.

2. During the production of the metal-glutins, the alkali-metal-salts of the corresponding anions are added to the reaction-mixture in the following manner:—

(a) Simultaneously with the separating salt, or (b) First a part of the metal-salt solution, thereafter the alkali-metal-salt of the corresponding anions, and finally the rest of the metal-salt.

*Example.*

1. A glutin-solution may be derived from animal wastes which contain a glue-rendering tissue called ossein and which can be converted into glutin by cooking it with water at high temperatures. The resulting raw solution, of course, is a glutin-solution. By concentrating this solution by evaporation, one obtains the gelatinous form, which by dissolving again in water render a glutin-solution. A 20% glutin-solution is alkalized in such a manner, that for each litre of the solution are added 370 ccm. of a 5.41% solution of caustic soda. By sufficient agitation the alkali is well distributed and combined with the glutin, and then 630 cc. of an aluminium-sulphate solution, containing about 152 grammes of aluminium-sulphate per litre, are added to each litre of the glutin-solution.

The reaction mixture gradually becomes thicker until it is of a pasty consistency. The drying takes place gradually. After some hours the mass can be compressed and repeatedly washed with water, whereby the excess salt is removed. During the reaction the temperature is to be maintained at about 28° centigrade.

2. If it is desired to produce the zinc-combinations of the glutin instead of the aluminium-salts, the procedure is the same as above mentioned, but in place of the aluminium-sulphate solution I employ 630 ccm. of a zinc-sulphate solution, containing 215 grammes of sulphate of zinc per litre, for each litre of the glutin-solution.

I claim:—

1. A process of producing metal glutins as a chemical combination, consisting in alkalizing glutin by adding only such a quantity of alkali as is required to transform all the glutin into saturated alkali metal glutin and subsequently adding an insoluble glutinate-forming type of metallic salt.

2. A process of producing metal glutins as a chemical combination, consisting in alkalizing glutin and subsequently adding a metallic and insoluble glutinate-forming salt in excess of the quantity necessary for neutralizing the alkali employed.

3. A process of producing metal glutins as a chemical combination, consisting in alkalizing a glutin solution by adding thereto a normal alkali metal hydroxide solution and subsequently adding an insoluble glutinate-forming metallic salt in excess of the quantity necessary for neutralizing the alkali employed.

4. A process of producing metal-glutins, consisting in alkalizing glutin, subsequently adding a metallic and insoluble glutinate-forming salt, and finally adding alkali-metal-salts which salts in conjunction with metals of the aluminium-iron group results in difficultly soluble combinations.

5. A process of producing metal-glutins, consisting in alkalizing glutin, subsequently adding metallic salt, and simultaneously adding an insoluble glutinate-forming the alkali-metal-salts which salts in conjunction with metals of the aluminium-iron group result in difficultly soluble combinations.

6. A process of producing metal-glutins, consisting in alkalizing glutin, subsequently adding a portion of the quantity of a metallic and insoluble glutinate-forming salt necessary for precipitating, adding the remaining portion of alkali-metal-salts which salts in conjunction with metals of the aluminium-iron group result in difficultly soluble combinations, and finally adding the remaining portion of the said metallic salt.

7. As a new article of manufacture, an integral tenacious mass consisting solely of pure metal glutin, adapted while warm to be ductile and hence permit of fabrication to any desired shape and to become set and retain its shape when cool.

8. A process of producing metal-glutins as a chemical combination, consisting in alkalizing glutin, and subsequently adding an insoluble glutinate-forming metallic salt while the temperature is maintained at about 28° centigrade.

In testimony whereof I affix my signature.

KARL KÜTTEL.